Aug. 6, 1963 M. L. HALVERSON 3,100,048
SPORTS EQUIPMENT CARRYING CART
Filed Feb. 27, 1961 2 Sheets-Sheet 2
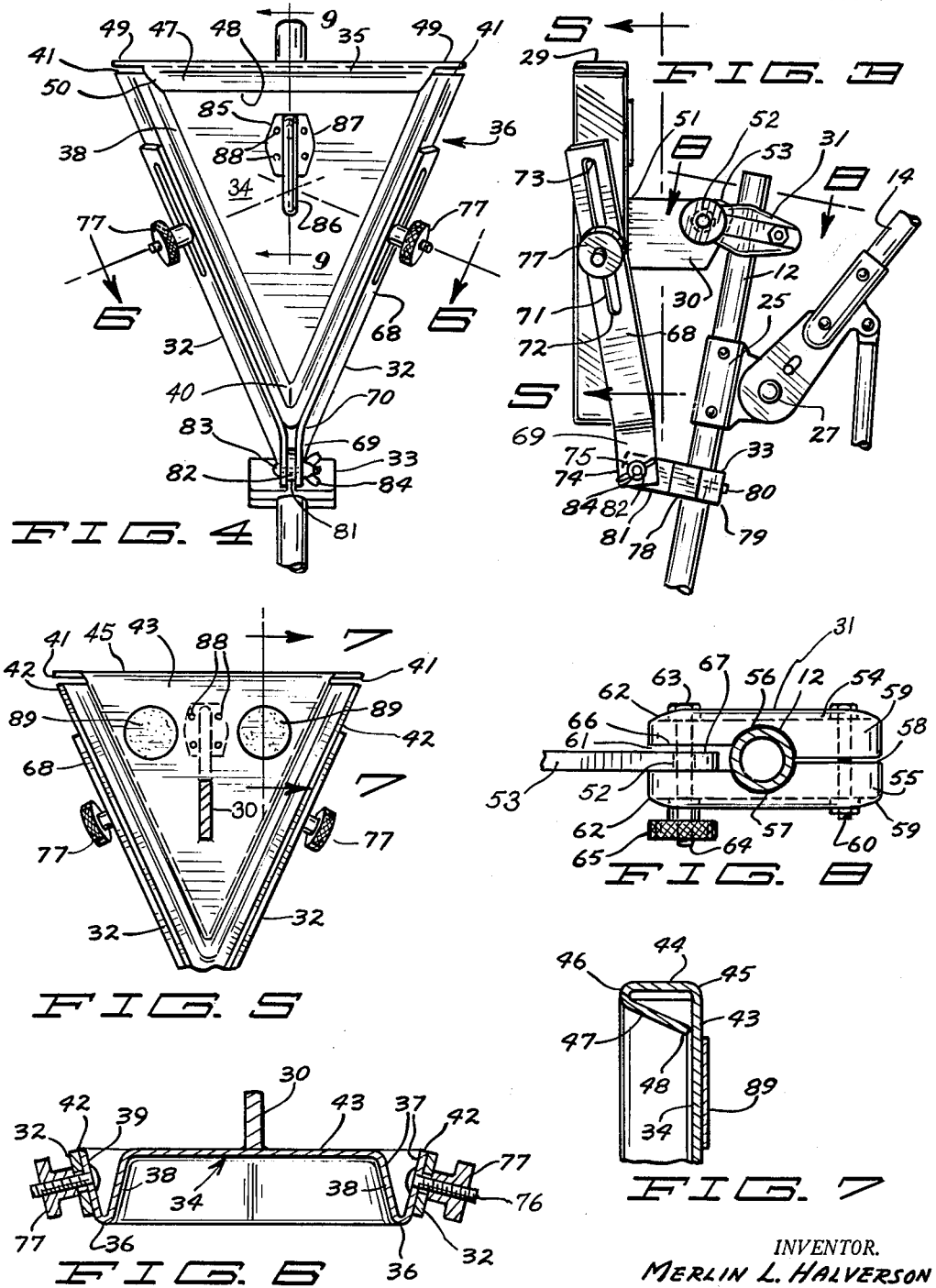
INVENTOR.
MERLIN L. HALVERSON
BY
Frederick C. Meyers
ATTORNEY United States Patent Office 3,100,048
Patented Aug. 6, 1963

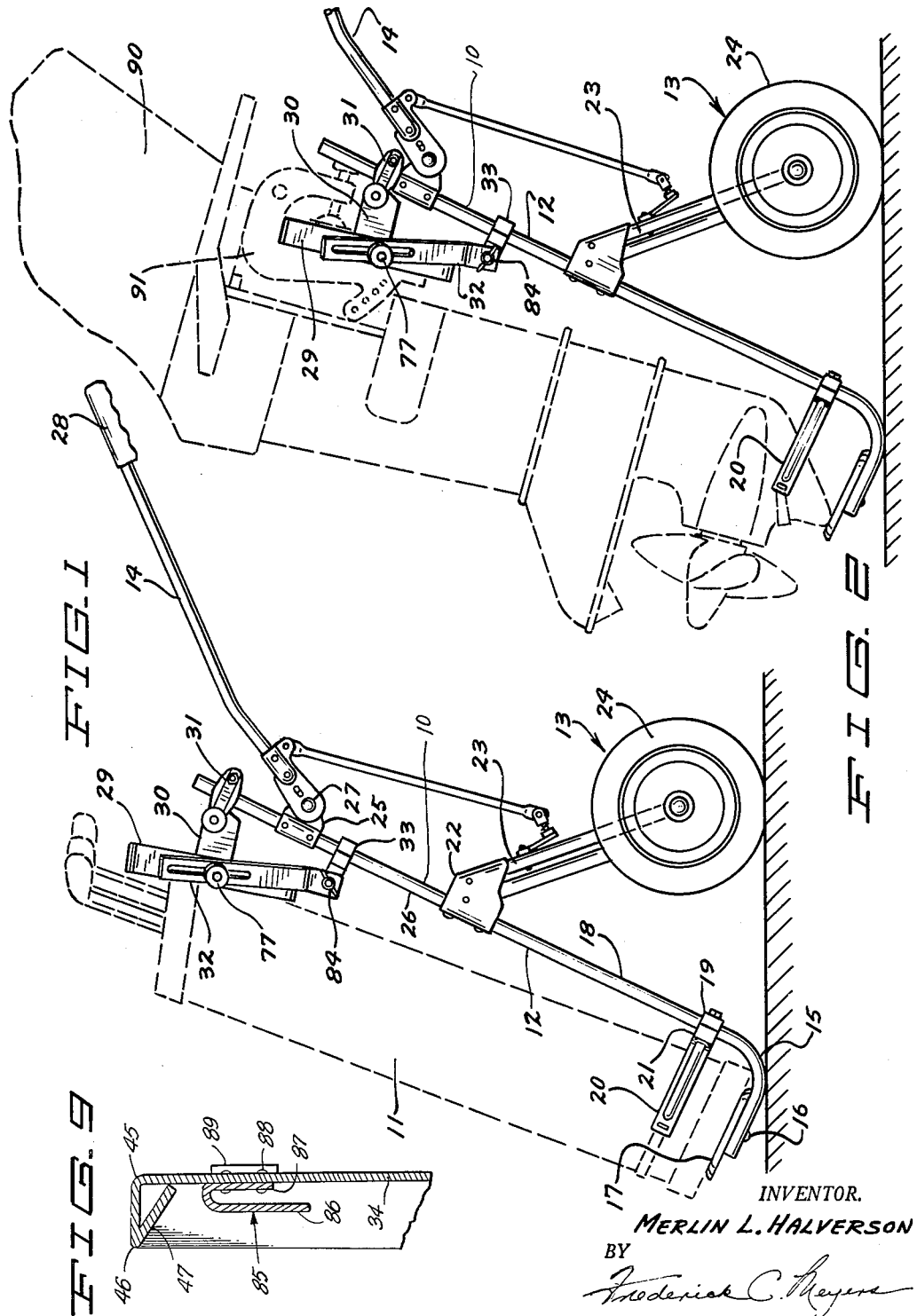

3,100,048
SPORTS EQUIPMENT CARRYING CART
Merlin L. Halverson, P.O. Box 306, Rte. 1, Mound, Minn.
Filed Feb. 27, 1961, Ser. No. 92,005
5 Claims. (Cl. 211—2)

This invention relates to a sports equipment carrying cart and more particularly to a cart so constructed as to be able to hold and transport articles of widely varying characteristics.

An object of this invention is to provide a portable and collapsible carrying cart which is both efficient in operation and inexpensive in manufacture.

Another object of this invention is to provide an attachment for a golf cart which furnishes a means of securing a golf bag thereto as well as an outboard motor.

A further object of this invention is to provide an attachment as described above which may be adjusted to accommodate golf bags and outboard motors of different sizes and weights, yet maintaining each in properly balanced relation to the cart.

Heretofore, golf bag carrying carts have been designed with many types of desirable features which pertained solely to the sport of golfing. In spite of the many sizes, shapes and configurations available on the market, substantially all of the carts have a similar construction which includes a vertical standard to which is attached a handle, wheel means, and a lower foot rest member. The difference in carrying carts is generally in the collapsing features and securing means for the upper end of the golf bag.

Also available in the market nowadays are carrying carts especially adapted for hauling cumbersome and reasonably heavy outboard motors. Contrary to the golf carts, as explained above, the motor carrying carts are all substantially the same in that a motor mounting plate is provided which is secured in a vertically held manner to a framework which in turn is mounted on a pair of wheels.

Avid outdoor sportsmen who enjoy the sports of both golfing and boating have previously been obliged to purchase two separate and distinct carrying carts in order to enhance the enjoyment associated with the sports. However, I now propose, and set forth herein, my invention which includes a special mounting head capable of accommodating both golf carts and outboard motors when attached to a folding cart of the class described.

The invention contemplates a mounting relation between the wheel axis and the weight supporting member of the carrier wherein the resultant weight force of the item carried is substantially vertical to the wheel axis, so that during the carrying process the weight of the item carried is properly balanced.

These and other objects and advantages of my invention will more fully appear from the following description, made in connection with the accompanying drawings, wherein like reference characters refer to the same or similar parts throughout the several views and in which:

FIGURE 1 is a side elevational view showing the cart in a golf bag carrying position;

FIGURE 2 is a similar view showing my cart in the outboard motor carrying position;

FIGURE 3 is an enlarged side view of the upper portions of the carrying cart having elements not necessary to a full understanding of my invention removed;

FIGURE 4 is a front view of my attachment taken from the left of FIGURE 3;

FIGURE 5 is a rear view of parts of my attachment taken at cross section line 5—5 of FIGURE 3;

FIGURE 6 is a cross sectional view of FIGURE 4 taken at line 6—6;

FIGURE 7 is a segmental cross sectional view of FIGURE 4 taken at lines 7—7;

FIGURE 8 is a segmental cross sectional view taken at line 8—8 of FIGURE 3; and

FIGURE 9 is a segmental cross-sectional side view of FIGURE 4 taken on line 9—9, whereby to more clearly show the hook means.

Referring now more particularly to FIGURE 1, I show my carrying cart referred to generally as 10 having a golf bag and clubs 11 which are represented in dotted lines. The carrying cart is comprised of conventional elements such as the standard 12, wheel assemblage 13 and handle assemblage 14.

More specifically, standard 12 is an elongate and preferably tubular member having an L-shaped bend 15, to which is attached, by rivet 16 or similar means, a foot rest 17. Held in frictional engagement at the lower end 18 of standard 12 is a golf bag holder clamp 19 which pivotally secures a golf bag holder 20 at 21.

Central clamp 22 secures legs 23 and wheel 24, all which constitute the wheel assemblage 13, to the standard 12. As understood by those skilled in the art, the central clamp provides a means for collapsing the wheels for storage and transporting purposes.

Comprising the handle assemblage 14 is a handle clamp 25, which is frictionally held to the upper portion 26 of standard 12, and provides a pivotal means at 27 for securing handle 28.

Referring now to my cart, and FIGURE 1, I provide generally a principal securing plate or transom 29 to which is permanently secured a support member 30. Interposed between the standard 12 and support member 30 is a plate clamp 31. Frictionally secured to the side edge of the securing plate 29 is a pair of brace members 32 which in turn are pivotally attached to standard 12 by means of brace clamp 33. Brace members 32 may be so constructed as to provide auxiliary support for the sides of a golf bag.

Referring now to the enlarged views of my structure, I show a side view thereof in FIGURE 3 having the conventional elements removed. In more detail, the securing plate 29 is formed from a single sheet of heavy-duty material such as metal alloy or even reinforced plastic sheet and is bent into a triangularly shaped dish form having a front face surface 34 (see FIGURE 4) which is depressed from the upwardly directed free transom edge 35 and side edges 36. A clearer understanding of the securing plate configuration may be obtained by referring also to FIGURE 6 which shows the cross section of the plate wherein the face 34 is shown in depressed relation to side edges 36.

The side edges 36 are formed into triangularly shaped channels 37, so as to provide rigidity of structure, and are formed by sides 38 and 39. As seen in FIGURE 4, sides 38 and 39 terminate at a lower apex 40 and upper end 41. As seen in FIGURE 6, side 39 terminates in an edge 42 which lies substantially in the same plane as the rear face 43 of the securing plate 29.

Referring now to FIGURE 4 and FIGURE 7, I show the top upstanding free edge 35 consisting of a bent cover member 44 which is positioned substantially in a right angle bend 45 to rear face 43, and which terminates in an acute angle bend 46 to which is continuously joined a lip member 47. Lip member 47 in turn terminates in end 48. As seen in FIGURE 7, lip end 48 lies closely adjacent to front surface 34 for purpose of eye appeal in addition to providing added structural strength. Bent cover member 44 terminates longitudinally in ends 49, which are angulated to accommodate side 39 of the side edges 36, and lip member 47 terminates at ends 50 which are angulated to conform to the side 38 of side edges 36.

It will now be noted that by constructing the securing plate 29 from a single piece of sheet material, I have been able to provide the necessary structural strength to accommodate both golf bags or outboard motors with a minimum of material volume and weight.

As seen in FIGURES 3 and 5, the rear surface 43 of securing plate 29 is fixedly attached to a support member 30 at joint 51. Support member 30 is a simple rectangularly shaped element which has a hole 52 located through the outer end 53.

Referring additionally to FIGURE 8 now, the plate clamp 31 is comprised of two mating members 54 and 55 which have medial arcuate recesses 56 and 57 adapted to frictionally engage with standard 12. Plate clamp members 54 and 55 are so formed that the separation 58 of rear portions 59 is small enough to close upon tightening of screw 60 and such that separation 61 of the forward portions 62 at the same time is sufficiently wide to admit the outer end 53 of support member 30. As may be seen, a bolt 63 extends through the forward portion 62 of the members 54 and 55 and extends through hole 52 of support member 30. Secured to the end 64 of bolt 63 is a knurled nut 65 which will permit easy adjustment of the attachment by the operator. Upon tightening of knurled nut 65, the forward ends 62 will draw together to frictionally engage support member 30 at surfaces 66 and 67.

As seen in FIGURES 3, 4 and 6, the securing plate 29 is engaged at the side 39 of side edges 36 by brace members 32. Brace member 32 has an upper portion 68 and a lower portion 69 which are joined in an angle joint 70 which accommodates the angulation of the securing plate 29. The upper end 68 has an open medial portion 71 extending from end 72 and 73 to allow angulated adjustment of the securing plate. The lower end 69 terminates in an end 74 which has a hole 75 drilled therethrough for mounting to the brace clamp 33. As seen in FIGURE 6, the brace 32 is secured to the side 39 of securing plate 29 by means of bolt 76 and knurled nut 77 which also provides speedy adjustment by the operator.

Brace clamp 33 is comprised of two blocks 78 and 79 which are adapted to frictionally engage with the standard 12 in a similar manner to that of plate clamp 31. In the brace clamp, however, a metal screw 80 is provided on either side of the standard 12 for securing the elements 78 and 79 tightly together.

Forming a part of the brace clamp element 33 is an extension 81 which has a hole 82 for receiving bolt 83 therethrough. As seen in FIGURE 4, bolt 83 secures the lower end 69 of braces 32 to the brace clamp. A wing nut 84 is provided for speedy adjustment of the brace 32 and securing plate 29.

In order that my attachment may positively secure the top of a golf bag, I provide a rearwardly mounted holding means such as simple hook means 85 (See particularly FIGURES 4 and 9) having a forwardly projecting spring portion 86 which is continuous with a mounting portion 87. Hook means 85 in turn is secured to the face surface 34 by means of threaded fasteners or rivets 88. The hook means is adapted to secure a golf bag by having the upper edge of the golf bag interfitted between spring portion 86 and mounting portion 87 whereby the spring portion 86 is positioned inside the golf bag. It may be seen that sides 38 of the attachment co-operate in abutting against, and stabilizing, a golf bag when held by hook means 85. It is, of course, understood that other types of holding means such as arms or straps are within the contemplation of the invention herein described.

Referring to FIGURE 5, I prefer a pair of motor mount pads 89 to which an outboard motor may be secured as is understood by those familiar with the conventional outboard motor. When an outboard motor is correctly positioned, preparatory to transporting, the motor 90 will be positioned on my cart as seen in FIGURE 2 wherein the securing plate 29 has been previously adjusted to accommodate the tilt angle of the motor transom mount 91.

In the use of my carrying cart for golfing purposes, the plate clamp 31 and brace clamp 33 would first be positioned to a height on standard 12 wherein the golf bag, as positioned in FIGURE 1, is so positioned that the top edge of the golf bag is slightly higher than the lower end of the spring portion 86. Next, the securing plate is angularly adjusted to properly coincide with the upper edge of the golf bag 11 and finally the golf bag is inserted in the carrying cart by holding the lower end of the golf bag outwardly of the cart after which the upper edge is slid under the spring portion 86 of hook means 85. Then the lower end of the golf bag is seated upon the foot rest 17 and held between golf bag holders 20 located on either side of the golf bag. The reverse operation of the above, of course, is all that is required for removing the golf bag from the cart.

Assuming now that the operator desires to mount an outboard motor, the securing plate is first positioned at an angle substantially that of the motor transom mount 91, the angulation not being critical because my constructed attachment permits the existence of a high torque without serious consequence, therefore, the propeller end of the motor need not rest against the lower portion of the carrying cart but may be positioned outwardly therefrom by a reasonable amount.

The next step is simply that of positioning the motor on the securing plate and tightening down the motor clamps upon the motor mount pads 89 as set forth above.

Through the particular adjustment arrangement which I provide, I can shift a substantial amount of the weight (when held by the securing plate) forward or backward simply by moving the attachment up or down on the standard or changing the angulation of the securing plate since both operations would change the location of the resultant weight force component either forwardly or rearwardly of the carrying cart wheel axis. I may also provide angulation of my securing plate so that the motor, when positioned on the cart, may be stored over long periods of time in a vertical position.

It will, of course, be understood that various changes may be made in the form, details, arrangements and proportions of the parts without departing from the scope of my invention as set forth in the appended claims.

What is claimed is:

1. An attachment for a conventional golf cart having a standard, said attachment comprising, a securing plate having an upwardly directed free edge adapted for securing an outboard motor thereto, said securing plate also having a rearwardly mounted holding means adapted for securing a golf bag thereto, a support member fixedly secured at one end thereof to the rear of said securing plate and adapted to be pivotally mounted at the other end to the upper end of a golf cart standard, and at least one brace member slidably engaged substantially at one end thereof with the side of said securing plate and adapted to be also pivotally secured at the other end to said golf cart standard.

2. The attachment of claim 1 wherein said holding means constitutes a downwardly directed hook for securing the upper portions of a golf bag thereto.

3. A golf bag and outboard motor holding attachment for a conventional golf cart having a standard, said attachment comprising a securing plate formed from a single substantially flat and rigid sheet of material, said plate having a depressed flat face surface and a flat rear surface, said face surface further having continuous sides extending forwardly thereof, a pair of braces, one end of each having a longitudinal brace opening, the other end having a means adapted for pivotally mounting to a standard, a threaded fastener secured to each of said continuous sides and engaged through one of said longitudinal brace openings for frictional engagement of said brace to said continuous side, a rigid support member secured endwise at one end to said flat rear surface and adapted to be pivotally secured at the other end thereof to said standard, whereby said securing plate may be angularly adjusted by means of said threaded fasteners and braces.

4. An attachment for a conventional golf cart as set forth in claim 3 wherein said depressed flat face surface further has a securing means adapted for securing to the top of a golf bag and said flat back surface has a motor mounting means adapted for receiving and holding an outboard motor in supporting relation thereto.

5. An attachment for a conventional golf cart having a standard, said attachment comprising, a securing plate having a face surface and a rear surface, said face surface having at least a pair of outwardly extending sides continuous with said face surface, a brace clamp adapted to be mounted on a golf cart standard, a pair of braces, one end of each brace being pivotally and disengageably secured to one of said outwardly formed sides at the lower end thereof and the other end being held in pivotal engagement with a portion of said brace clamp, a plate clamp adapted to be mounted on said standard in overlying relation to said brace clamp, a rigid support member secured at one end thereof to said rear surface and means for pivotally securing the other end to said plate clamp whereby said securing plate may be angularly adjusted and said attachment may be moved along said standard to accommodate differently sized and weighted golf bags and outboard motors.

References Cited in the file of this patent
UNITED STATES PATENTS
2,450,304     Shiflet _____ Sept. 28, 1948